Feb. 3, 1931.  B. T. ANDREN  1,790,738
METHOD OF ELECTRIC WELDING THICK METAL PLATES
Filed May 13, 1929
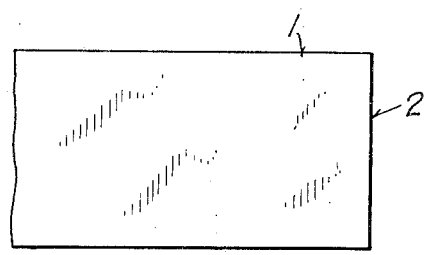
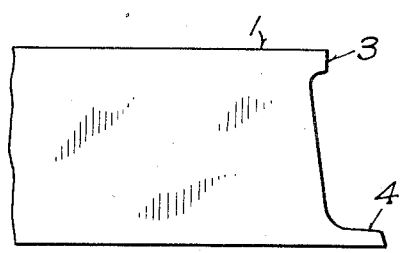
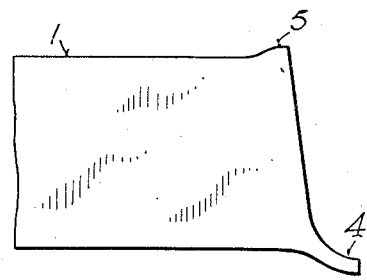
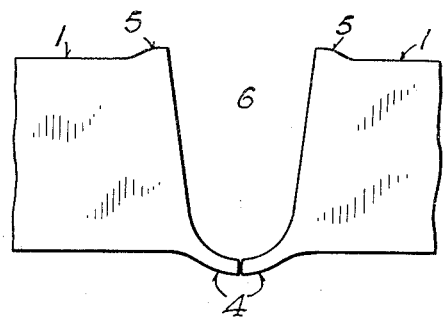
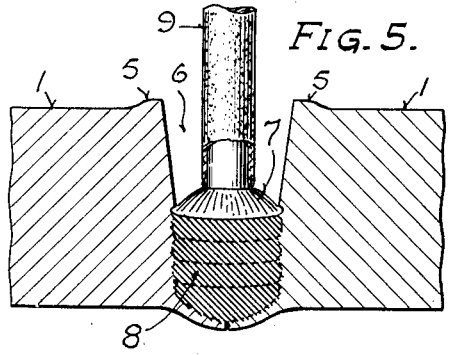
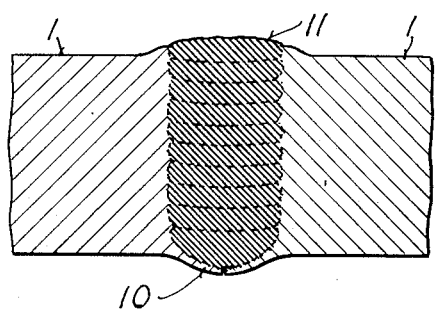
INVENTOR.
Birger T. Andren
BY
ATTORNEY.

Patented Feb. 3, 1931

1,790,738

UNITED STATES PATENT OFFICE

BIRGER TORVALD ANDREN, OF MILWAUKEE, WISCONSIN, ASSIGNOR TO A. O. SMITH CORPORATION, OF MILWAUKEE, WISCONSIN, A CORPORATION OF NEW YORK

METHOD OF ELECTRIC WELDING THICK METAL PLATES

Application filed May 13, 1929. Serial No. 362,684.

This invention relates to a method of electric welding thick metal plates and has particular application to the manufacture of thick walled pressure vessels as disclosed in Reissue Patent No. 16,865, issued to L. R. Smith, although it has an advantageous application to the manufacture of other articles.

In the manufacture of such pressure vessels which are often employed under hazardous conditions of temperature and pressure with highly inflammable fluids therein, it is greatly desirable that the welds produced have the maximum strength and quality possible, irrespective of expense. As disclosed in said patent, such vessels are fabricated from excessively thick metal plates arranged edge to edge with deep welding grooves therebetween, and the plates are welded and fused together by means of an electric arc which deposits fusing welding metal in the grooves from a fusible metallic electrode. In order to insure a maximum strength and quality of weld it has been found desirable to have the deposited fusing welding metal approximate the thickness of the metal plates which are united thereby.

The object of the present invention is to provide a method of electric arc welding thick metal plates which will insure the production of a weld substantially as thick as the plates being united thereby.

Another object is to provide a novel method of preparing the edges for welding and a novel scarf for the edges to be welded.

Other objects and advantages will appear hereinafter.

The accompanying drawing illustrates an embodiment of the invention and the views therein are as follows:

Figure 1 is an end elevation of a portion of a thick metal plate showing the plane edge thereof.

Fig. 2 illustrates the edge after the preliminary scarfing operation.

Fig. 3 illustrates the edge finally prepared for welding.

Fig. 4 is an end elevation showing a welding groove between two plates prepared as shown in Fig. 3.

Fig. 5 is a transverse section illustrating the welding operation in progress.

Fig. 6 is a transverse section of the completed weld.

In the preferred embodiment of the invention the thick metal plate 1, which may be three inches, more or less, in thickness, is placed in a planer where the edge 2 to be welded is scarfed as shown in Fig. 2. This scarf leaves the edge with a projection 3 at its upper corner and a longer thin projection 4 at its lower corner.

In the next step, suitable hydraulic or air hammers are employed to flatten the projection 3 and upset the metal of the plate to form a raised bead 5 at the upper corner of the edge as shown in Fig. 3. The final preparation of the edge is accomplished by bending the projection or lip 4 downwardly so that its outer end is substantially below the lower plane of the plate and its beveled end becomes substantially vertical.

Two plates having their edges prepared for welding as shown in Fig. 3 are then placed edge to edge with the downwardly inclined lips 4 meeting below the lower plane of the plates, and forming a welding groove 6 between the edges which groove is substantially deeper than the thickness of the plates. Furthermore, the groove 6 preferably extends both below and above the plates as shown in Fig. 4.

The plates are then welded together by an electric arc 7 (Fig. 5), which is caused to pass repeatedly along the welding groove 6 and to deposit fusing welding metal 8 therein from a fusible metallic electrode 9. The welding operations are continued until the welding groove is completely filled with fusing welding metal as shown in Fig. 6.

The completed weld, thus produced, has a bead 10 at the bottom formed from the fusion of the lips 4 with fusing deposited welding metal, and a bead 11 at the top formed by the raised beads 5—5 and the deposited fusing welding metal therebetween.

I claim:

1. The method of electric arc welding metal plates, which comprises chamfering the edges to be welded and forming raised beads at the upper corner thereof and downwardly inclined lips at the lower corners thereof, arranging the plates edge to edge with the lips meeting below the normal lower plane of the edges to define the bottom of a welding groove which is substantially deeper than the thickness of the plates to be united, and welding the plates by filling said groove with fusing welding metal.

2. In electric arc welding metal plates, the steps which comprise chamfering the edges to be welded, leaving projections extending therefrom at the upper corners of the edges, upsetting the metal of the plates by flattening said projections to form raised beads at the upper corners of the edges, arranging the edges of the plates in welding proximity, depositing welding metal between the edges of the plates by means of an electric arc to weld the plates together.

3. An electrically welded article composed of plates welded together by a deposit of fused welding metal, the weld having strengthening beads extending above and below the same and formed from a fusion of the plate metal with deposited welding metal, the bead at the top of the weld being composed of deposited weld metal fused with raised metal at the edges of said plates, and the bead at the bottom of the weld being composed of deposited weld metal fused with lips integral with the plate metal and extending below the lower plane of the plates.

In testimony whereof, I have signed my name at Milwaukee, Wisconsin, this 9th of May, 1929.

B. T. ANDREN.